United States Patent Office 3,110,238
Patented Nov. 12, 1963

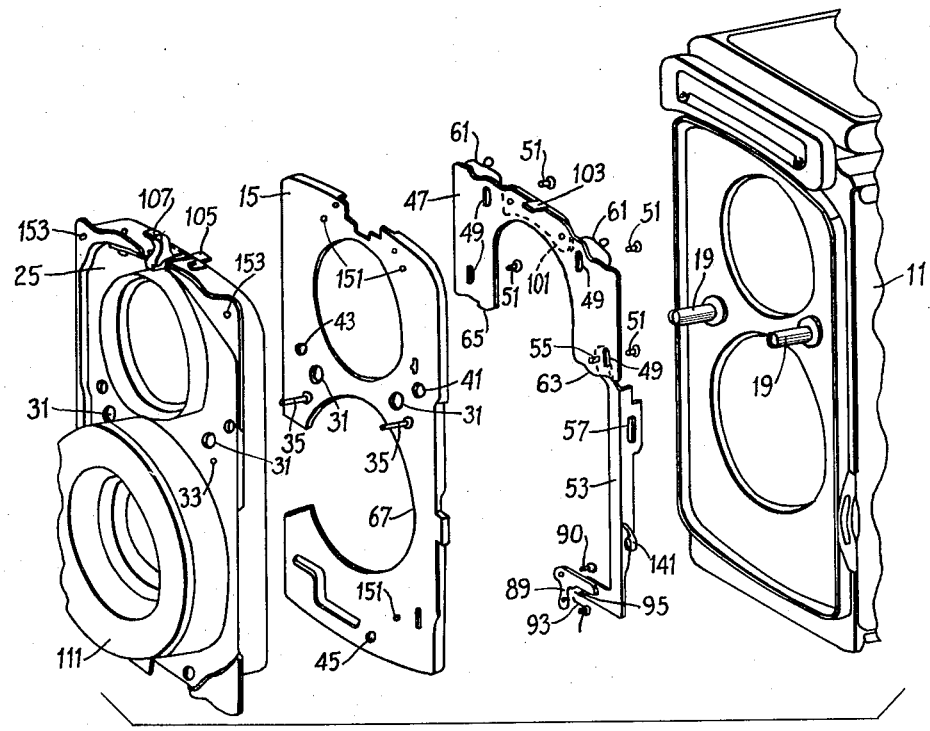
Fig. 2
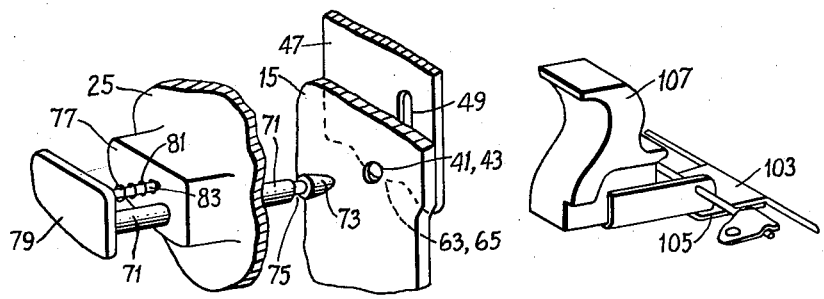
Fig. 3
Fig. 4

3,110,238
PHOTOGRAPHIC CAMERA
Werner Faasch, Braunschweig-Bienrode, and Kurt Kückelhahn, Braunschweig, Germany, assignors to Franke & Heidecke, Fabrik Photographischer Prazisions-Apparate, Braunschweig, Germany, a firm of Germany
Filed Jan. 10, 1961, Ser. No. 81,712
Claims priority, application Germany Jan. 16, 1960
7 Claims. (Cl. 95—45)

The present invention relates to a twin lens mirror reflex type of photographic camera having a focusing viewfinder chamber arranged above an exposure chamber in a common rigid housing, the objectives therefor being jointly mounted for adjustment on the camera body in the direction of the optical axis. More particularly, the invention concerns the mounting of the objective support for interchangeability.

An object of the invention is to provide a generally improved and more satisfactory arrangement for interchanging the objectives of a twin lens mirror reflex camera.

Another object is the provision of a new and improved interchangeable objective support so that pairs of objectives mounted on the support may be manufactured independently of the camera body.

A further object is to provide for interchangeability of the objectives in a twin lens mirror reflex camera in such a manner that an amateur may change the pair of objectives without lowering the performance of the camera.

These and other desirable objects may be attained in the manner disclosed as an illustrative embodiment of the invention in the following description and in the accompanying drawings forming a part hereof, in which:

FIG. 2 is an exploded perspective view of the camera base plate and the objective support;

FIG. 3 is a fragmentary exploded view of a latch;

FIG. 4 is a fragmentary perspective view of an unlatching device;

Figure 1:
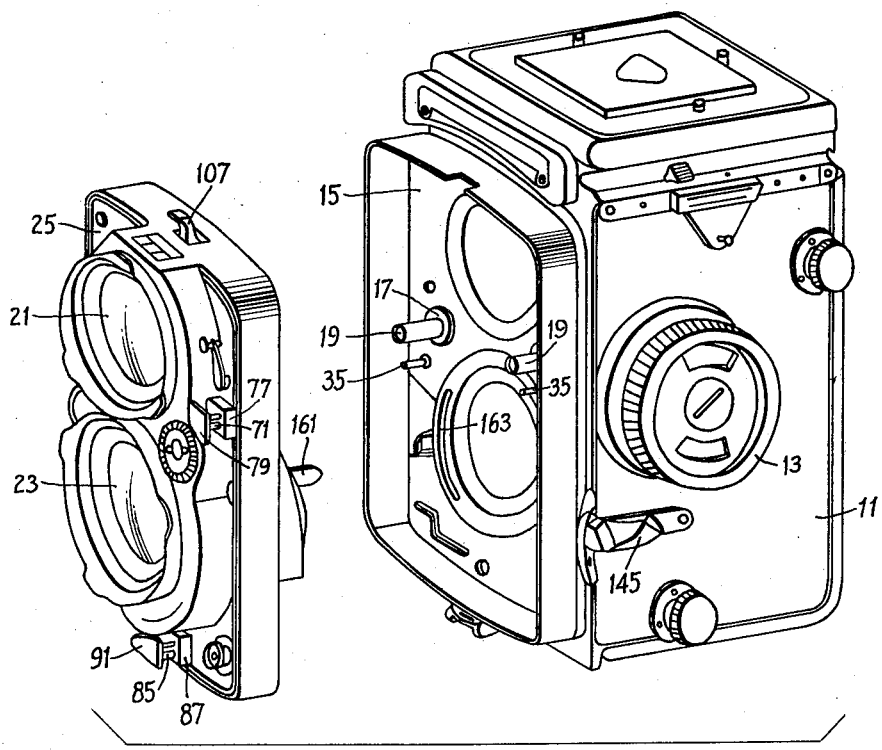
FIG. 1 is a perspective view of the complete camera with the objective support detached.

In FIG. 1 is illustrated a camera body 11 of a twin lens mirror reflex camera of any suitable construction. The present invention is illustrated, by way of example, as applied to the "Rolleiflex" or "Rolleicord" cameras, manufactured by the firm of Franke & Heidecke, of Braunschweig, Germany, and widely used throughout the United States and elsewhere. The following description presupposes that the reader is familiar with the construction of these cameras. Those who are not already familiar with such construction may obtain detailed information by consulting the book "Rollei Photography, Handbook of the Rolleiflex and Rolleicord Cameras," by Jacob Deschin, published in 1952 by The Camera Craft Publishing Company, of San Francisco, California.

On the side of the camera body 11 is a focusing knob 13 which upon adjustment serves to displace a front plate 15 forwardly and rearwardly with respect to the camera body for the purpose of focusing. The front plate 15 is guided on the camera body by means of bushes 17 which slide on a pair of pins 19 projecting forwardly from the camera body parallel to the optical axis. In addition to being guided on the pins 19, the front plate 15 is also preferably connected to the conventional lateral guide rails which are mounted for sliding movement in the camera body itself, parallel to the optical axis, as well known in the art and as illustrated for example on page 71 of the aforementioned book. Rotation of the focusing knob 13 acts on the lateral guide rails in the usual manner to move the entire front plate 15 forwardly or rearwardly for focusing.

The focusing viewfinder objective 21 and the exposure or picture taking objective 23 of the camera are mounted on an objective supporting plate 25. It will be understood that incident light rays passing through the exposure objective 23 travel through the exposure chamber of the camera to impinge upon the film mounted at the rear. Light rays passing through the upper or focusing viewfinder objective 21 are reflected in known manner by a mirror not here shown to a focusing screen at the top of the camera.

When assembling the camera, the front plate 15 is alined perpendicular to the optical axes of the two objectives 21 and 23 and parallel to the rear film guide frame of the camera.

Referring to FIG. 2, the objective supporting plate 25 and also the camera front plate 15 are formed with alined holes 31 for the guide pins 19 of the camera, while the plate 25 has additional holes 33 for a pair of guide pins 35 fixed to the front plate 15. An accurate guiding of the objective supporting plate 25 in relation to the front plate 15 is achieved by these additional pins 35.

The front plate 15 has three additional apertures 41, 43, and 45, the first two of these apertures being on opposite sides of the vertical center line and above the middle thereof, while the third aperture 45 is toward the bottom. Slidable vertically on the rear face of the plate 15 is a latching plate or slide 47 which is guided for movement perpendicular to the optical axis by means of slots 49 in the slide 47 engaging on screws 51 secured to and projecting rearwardly from the plate 15. Another slide 53 is pivoted to the slide 47 at 55, and is mounted for movement therewith by a slot guide 57 which engages a pin on the front plate 15. It may be observed from FIG. 1 that the plates 15 and 25 have side flanges extending in a front to rear direction and fit telescopically inside one another when the camera is assembled.

The slide 47 is normally pressed downwardly by springs 61, to a rest position in which the lower edges 63 and 65 of the slide at either side of an opening 67 for viewfinder objective rays are disposed slightly below the top edges of the apertures 41 and 43 in the front plate 15. These edges 63 and 65 serve as latches for axial latch pins 71, see FIG. 3, mounted on the objective supporting plate 25. The two latch pins 71 at either side have rounded or conical heads 73 and circumferential grooves 75 into which the edges 63 and 65 can drop to serve as latches to hold the pins 71 against forward axial withdrawal from their respective openings 41 and 43.

Each pin 71 extends forwardly through a guiding bore in a boss 77 on the front surface of the plate 25, and at the forward end of the pin is a finger piece or key 79 to be pressed manually. A compression spring 81 is mounted on a pin 83 fixed to the finger piece 79 and extending rearwardly into another bore in the boss 77. Since the springs 81 tend to force the pins 71 outwardly or forwardly when rearward finger pressure on the members 79 is released, these springs effect a resilient bracing or connection between the objective supporting plate 25 and the front plate 15.

A third latch pin 85 is mounted in a bore in a boss 87 provided on the lower part of the objective supporting plate 25, and extends through the hole 45 in the plate 15 to cooperate with a separate latch 89 in the form of a bellcrank lever pivoted on a stationary pin 90 projecting rearwardly from the rear face of the plate 15. The latch pin 85 is identical with the pins 71, and is operated by pressing inwardly on a finger piece or head 91. Like the pins 71, the pin 85 has a circumferential groove which is engaged by the depending arm of the bellcrank latch member 89, which is biased into latching position by a suitable spring 93. The latch 89 is non-positively coupled with the slide 53 by means of a pin 95 which engages a second arm of the bellcrank latch when the slide 53 is pulled upwardly, to swing the latch out of engagement with the groove in the latch pin 85 against the force of the spring 93. The three pins 71 and 85 comprise a multi-point (specifically, a three-point) support for pressing the plate 25 toward the plate 15, at the same time also serving as releasable latches.

As has been mentioned, the slide 47 and also the slide 53 are urged downwardly in locking position by the springs 61. Upon pulling upwardly on the slide 47, it can be seen that the latch pins 71 are released since the edges 63 and 65 of the slide 47 are retracted from the circumferential grooves 75 in the pins. At the same time, the slide 53 is elevated, and the pin 95 strikes the latch 89 to swing it counterclockwise and release the third latch pin 85. To provide for the unlatching, a plate 101 is fastened to the upper end of the slide 47 and has a forwardly projecting nose or ear 103. With the objective support 25 fitted to the front plate 15, this nose lies over a lug 105 of a release lever 107 (see also FIG. 4) which is rotatably mounted on the objective supporting plate 25 and has a handle projecting upwardly and forwardly in position to be manually operated. Upon depressing the lever 107 downwardly and forwardly, the lug 105 presses upwardly on the nose 103 and lifts the slide 47 upwardly, carrying along with it the slide 53. In this manner the latch pins 71 and 85 are released, and the objective supporting plate 25 with the objectives 21 and 23 may be pulled forwardly and removed from the camera.

Figure 5:
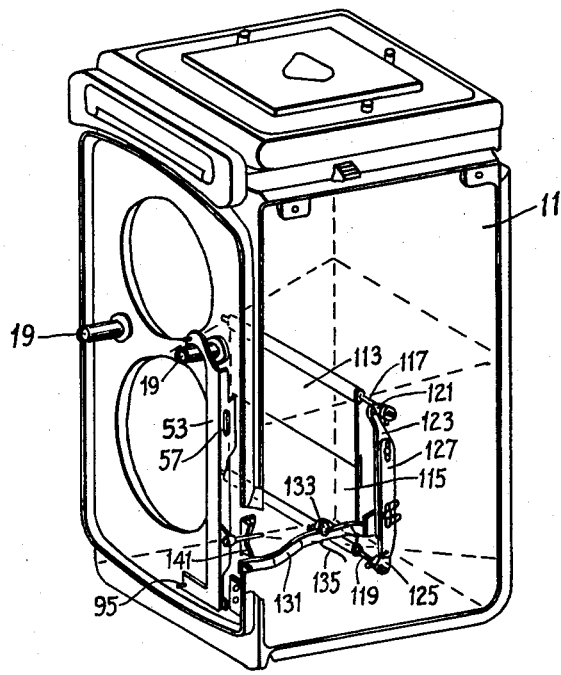
FIG. 5 is a fragmentary perspective view of the camera body with one side wall and other parts removed, showing in particular a portion of a latch structure and also a safety light shutter.
Figure 6:
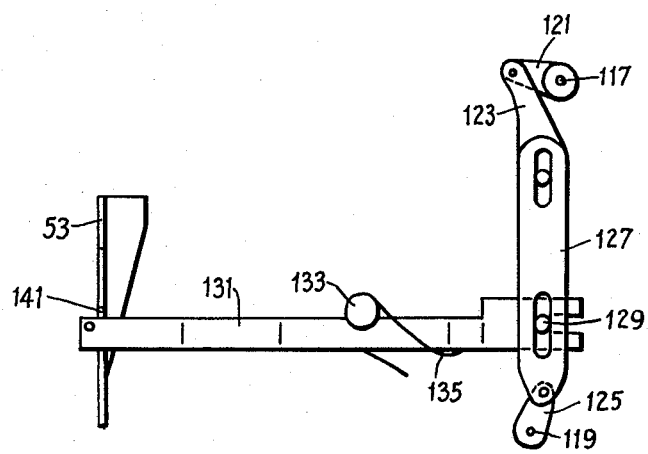
FIG. 6 is a side view of only the actuating linkage for the safety shutter.

With the objectives fitted onto the camera, undesired light is of course prevented from reaching the film by the conventional objective shutter indicated in general at 111 and mounted on the plate 25. On detaching the objective supporting plate with its objective shutter 111, the light sensitive film is protected from the incidence of light by a pair of masks 113 and 115 (FIG. 5) within the camera body 11. These masks are respectively fixed to the transverse pins or rods 117 and 119, which are journalled for rotation in the camera body and are interconnected by a lever arrangement. An arm 121 is fixed to one end of the pin 117 (see FIG. 6 as well as FIG. 5) and in turn is pivotally connected with a link 123. In similar fashion, an arm 125 is fixed to the end of the pin 119, and is also pivoted to a link 127. The two links 123 and 127 are coupled for conjoint movement by a pair of slot and pin connections to allow for some longitudinal adjustment of the two links relative to each other, for close adjustment of the positions of the two shutter flaps 113 and 115 relative to each other. A pin 129 on the links is engaged by the bifurcated end of a double armed lever 131 which is pivoted on a pin 133 and is biased by a spring 135 in such a way that the masks 113 and 115 tend to move to closed position, obstructing the passage of light to the film. When the objective support 25 is mounted on the camera, the slide 53 has an outwardly bent portion 141 which acts as an abutment to engage the end of the lever 131 and hold it in mask-opening position after it has been manually moved to such position. The lever 131 has enough lateral resiliency to enable it to slide past the abutment 141 during the manual opening movement, and to snap under the abutment to be retained thereby. But when the objective support 25 is to be removed from the camera, the upward unlatching movement of the latch members 47 and 53 will move the abutment 141 upwardly, releasing the lever 131 so that the masks or flaps 113 and 115 close automatically under the influence of the spring 135. For manually opening the flaps, there is fixed to the lever 131 an external operating member 145 as shown in FIG. 1 by which the masks or flaps 113 and 115 can be opened when the camera is correctly assembled with the objective support 25 fitted on. If desired the slide 53 may be provided with an additional nose or other appropriate actuating device which serves as a locking means to prevent actuation of the lever 131 and thus an opening of the light masks 113 and 115 with the objective support removed.

To facilitate the accurate alinement of the objective support plate 25 with the front plate 15, the front plate 15 also has a plurality of forwardly projecting pins 151 (preferably three) which form a bearing for the objective supporting plate 25. The pins 151 preferably are formed as threaded pins, so that they permit a setting or adjustment of the bearing plane of the objective plate 25. The objective supporting plate 25 may carry similar threaded adjusting pins 153 which project rearwardly and abut against the forward ends of the respective pins 151. The contact of the pins 153 with the pins 151 provides a three-point support for defining the exact position of the objective plate 25 with respect to the plate 15. Because of the adjustable nature of these abutment pins, initial factory adjustment can be made so that all cameras and all objective supports can be adjusted to a common plane, whereby arbitrary interchangeability is guaranteed.

The shutter 111 is preferably coupled with the film winding mechanism on the camera body 11 in the usual conventional manner, so that the shutter is automatically tensioned or cocked when the film is advanced from one frame to the next. The details of the interconnecting mechanism are not important for purposes of the present invention, and may take any known form, e.g., any of the forms disclosed in Knauf Patent 2,629,301 and Weiss Patent 2,868,099. For instance, the coupling elements of the objective shutter and the film wind mechanism include a transmission member 161 mounted on and projecting rearwardly from the shutter 111 in a direction parallel to the optical axis, this member being swingable arcuately about the optical axis of the shutter and lens 23 as a center, and entering an arcuate slot 163 in the camera, to be engaged and swung by conventional parts within the camera when the film is advanced. Thus the cooperation and alternate locking between the shutter and the film winding mechanism is maintained when the objectives are interchanged.

The operation will be reviewed briefly. Assuming that the objective support 25 is separated from the camera body as shown in FIG. 1, it can be connected to the camera body by being pushed axially onto the guide pins 19 and 35, the guide pins 19 fitting in the holes 31, while the pins 35 slide through the holes 33. By pressing inwardly on the latch keys or finger pieces 79 and 91, the rounded noses of the latch pins 71 and 85 initially deflect the slide 47 upwardly against the force of the spring 61 and the latch member 89 laterally against the force of the spring 93, until snapping back into the circumferential grooves 75. In this manner the plates 25 and 15 are latched together, and the objective support plate 25 is braced resiliently against the front plate 15 by the springs 81, to make an accurately positioned three-point contact with the abutment members 151, two near the top and one near the bottom. Then the handle 145 is operated manually to open the masks or flaps 113 and 115. The camera is now ready for making an exposure.

In order to detach the objective support 25, the handle or lever 107 at the top is pressed downwardly, whereby the lug 105 lifts the nose 103 on the slide 47 to raise the lever edges 63 and 65 out of the circumferential grooves 75 of the guide pins 71. Consequently the pins 71 spring outwardly under the influence of their springs 81. At the same time that the latching slide 47 is lifted, the slide 53 is also lifted, and the pin 95 strikes one arm of the lever 89 and swings it counterclockwise to retract the other arm of the lever from the circumferential groove on the latch pin 85. Since this latch pin 85 also springs outwardly under the influence of its spring, the objective supporting plate 25 is now completely unlatched and can be completely detached by pulling it forwardly off of the pins 19 and 35.

An advantage of the invention is that it is now possible for pairs of objectives and the actual camera to be manufactured independently of one another, since there is interchangeability between the pairs of objectives on one hand and the various camera bodies on the other hand. Another particular advantage is that the amateur may interchange pairs of objectives on his camera as desired, without accepting a deterioration in the performance of the camera due to possible faulty alinement or faulty spacing of the lenses. Accurate alinement and spacing are assured by the resilient holding of the interchangeable lens unit against the three supporting points or abutment points of the camera unit.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A twin lens reflex camera having interchangeable objectives and including a focusing viewfinder chamber arrranged above an exposure chamber in a rigid camera body, said chambers having substantially parallel optical axes, guide means on said camera body, a front plate received on said guide means and adapted to be guided for axial movement relative to said rigid body for focusing, an objective supporting plate on which are mounted a viewfinder objective and an exposure objective, said objective supporting plate being removably received on said guide means, and a plurality of support and latching means operative substantially parallel to the optical axes for releasably coupling said objective supporting plate to said front plate, said support and latching means including spring means for pressing said objective supporting plate axially rearwardly toward said front plate at three spaced points each of which is materially offset from a straight line joining the other two points, to provide accurate alinement of said objective supporting plate relative to said front plate.

2. A construction as defined in claim 1, wherein said guide means comprise pins projecting forwardly from said camera body and mating holes in said objective supporting plate and front plate, and further including additional axially extending guide pins on said front plate to be received in holes on said objective supporting plate.

3. A construction as defined in claim 1, wherein said latching means comprises a plurality of latch pins resiliently mounted on said objective supporting plate and each having a conical head and a groove, and latches mounted on the back of said front plate to be releasably received in each of said grooves.

4. A twin lens reflex camera having interchangeable objectives and including a focusing viewfinder chamber arranged above an exposure chamber in a rigid camera body, said chambers having substantially parallel optical axes, axially extending guide means projecting forwardly from said camera body, a front plate received on said guide means and adapted to be guided for axial focusing movement, an objective supporting plate on which are mounted a viewfinder objective and an exposure objective with a shutter, said objective supporting plate being removably received on said guide means, a plurality of axial latching pins mounted on said objective supporting plate and extending into holes in said front plate at spaced intervals to provide a multipoint support, each of said latching pins having a conical head and a circumferential groove and being resiliently mounted on said objective supporting plate to effect a resilient bracing between said front plate and said objective supporting plate, said latching pins each having a finger piece on the front side of said objective supporting plate to be pressed manually, and latches mounted on the back of said front plate and each received in one of the grooves, said latches being resiliently mounted so as to be initially deflected by the conical heads of said latch pins and thereafter snapping into said grooves when assembling said objectives and objective supporting plate to the remainder of the camera.

5. A twin lens reflex camera having interchangeable objectives and including a focusing viewfinder chamber arranged above an exposure chamber in a rigid camera body, said chambers having substantially parallel optical axes, axially extending guide means projecting forwardly from said camera body, a front plate received on said guide means and adapted to be guided for axial focusing movement, an objective supporting plate on which are mounted a viewfinder objective and an exposure objective with a shutter, said objective supporting plate being removably received on said guide means, a plurality of axial latching pins mounted on said objective supporting plate and extending into holes in said front plate at spaced intervals to provide a multipoint support, each of said latching pins having a conical head and a circumferential groove, and latches mounted on the back of said front plate and each received in one of the grooves, said latches being resiliently mounted so as to be initially deflected by the conical heads of said latch pins and thereafter snapping into said grooves when assembling said objectives and objective supporting plate to the remainder of the camera, said latches including a slide plate slidably and resiliently mounted on said front plate and having edges movable into and out of the grooves in at least two of said latch pins, another latch being provided by a biased lever pivoted to said front plate for movement into and out of the groove in a third of said latch pins, and another slide connected to said slide plate for disengaging said other latch simultaneously with the disengaging of the first two latches.

6. A construction as defined in claim 5, further including a manually operated lever for lifting said slide plate and other slide to disengage said latches, whereupon said latch pins snap forwardly under the action of their springs to permit the objective supporting plate to be removed.

7. A twin lens reflex camera having interchangeable objectives and including a focusing viewfinder chamber arranged above an exposure chamber in a rigid camera body, said chambers having substantially parallel optical axes, axial guide means on said camera body, a front plate received on said guide means and adapted to be guided for axial movement, an objective supporting plate on which are mounted a viewfinder objective and an exposure objective with a shutter, said objective supporting plate being removably received on said guide means, a plurality of support and latching means operative substantially parallel to the optical axes for releasably coupling said objective supporting plate to said front plate, a pair of shutter masks for blocking off the exposure chamber when said objective supporting plate is removed, spring means and a linkage arrangement for urging said masks toward closed position, and means engaging said linkage arrangement to hold said masks in open position when said objective supporting plate is assembled on the camera, said masks moving to closed position automatically when said objective supporting plate is removed.

References Cited in the file of this patent

UNITED STATES PATENTS 2,741,964    Lachmann _____ Apr. 17, 1956